(12) United States Patent
Keily et al.

(10) Patent No.: US 8,860,347 B2
(45) Date of Patent: Oct. 14, 2014

(54) APPARATUS FOR REDUCING CURRENT DRAIN AND CURRENT SPIKE IMPACT ON BATTERY-POWERED ELECTRONIC DISPENSERS

(71) Applicant: Dispensing Dynamics International, City of Industry, CA (US)

(72) Inventors: Joel P. Keily, Corona, CA (US); Lockland Corley, Coquitlam (CA); Richard Lalau, North Vancouver (CA)

(73) Assignee: Dispensing Dynamics International, City of Industry, CA (US)

( * ) Notice: Subject to any disclaimer, the term of this patent is extended or adjusted under 35 U.S.C. 154(b) by 200 days.

(21) Appl. No.: 13/680,425

(22) Filed: Nov. 19, 2012

(65) Prior Publication Data

US 2014/0021887 A1    Jan. 23, 2014

Related U.S. Application Data

(60) Provisional application No. 61/629,836, filed on Nov. 29, 2011.

(51) Int. Cl.
H02P 1/18    (2006.01)

(52) U.S. Cl.
CPC ..................... *H02P 1/18* (2013.01)
USPC .............. 318/431; 318/139; 318/500

(58) Field of Classification Search
CPC ........................................ H02P 1/18
USPC ........... 318/17, 139, 430, 431, 434, 474, 476, 318/500
See application file for complete search history.

(56) References Cited

U.S. PATENT DOCUMENTS

| | | | | |
|---|---|---|---|---|
| 4,574,228 A | * | 3/1986 | Blue et al. | 318/696 |
| 7,331,426 B2 | * | 2/2008 | Jahkonen | 187/290 |
| 7,642,755 B2 | * | 1/2010 | Bartilson | 320/167 |
| 8,415,905 B2 | * | 4/2013 | Sean et al. | 318/139 |
| 8,698,437 B2 | * | 4/2014 | Mazumdar | 318/442 |

* cited by examiner

*Primary Examiner* — Bentsu Ro
(74) *Attorney, Agent, or Firm* — Thomas R. Lampe

(57) ABSTRACT

Apparatus and method for reducing current drain and current spike impact on a dispenser electric motor by employing a series of supercapacitors in a power supply current to provide at least a portion of the energy requirement of the dispenser electric motor upon initial energization.

16 Claims, 3 Drawing Sheets

Normal Power Supply
PCB

Normal Power Supply
PCB & supercapacitors

Disconnected Power Supply with
stored supercapacitor power

APPARATUS FOR REDUCING CURRENT DRAIN AND CURRENT SPIKE IMPACT ON BATTERY-POWERED ELECTRONIC DISPENSERS

This application is based on and claims the benefit of U.S. Provisional Patent Application No. 61/629,836, filed Nov. 29, 2011.

TECHNICAL FIELD

This invention relates to electronic dispensers, and more particularly to apparatus for reducing current drain and current spike impact on battery-powered electronic dispensers.

BACKGROUND OF THE INVENTION

It is well known to utilize batteries, for example alkaline batteries, to power electronic dispensers to cause operation of motors and perform other functions, an example being motor driven paper towel dispensers. On motor start, the initial stall current typically demands more than ten times the steady state operating current. This current demand places huge draw requirements on the batteries, shortening the overall life span of the batteries.

DISCLOSURE OF INVENTION

Utilizing the teachings of the present invention, a series combination of supercapacitors is incorporated in a battery-powered power supply circuit of an electronic dispenser.

When batteries are initially inserted, the batteries (or wall power) will pre-charge the supercapacitors. On motor start, instead of pulling the energy from the batteries (such as alkaline batteries), excess current demand will either be (a) withdrawn from the supercapacitors or (b) withdrawn partially from both the batteries and the supercapacitors to prolong battery life.

BEST MODE FOR CARRYING OUT THE INVENTION

Figure 1:
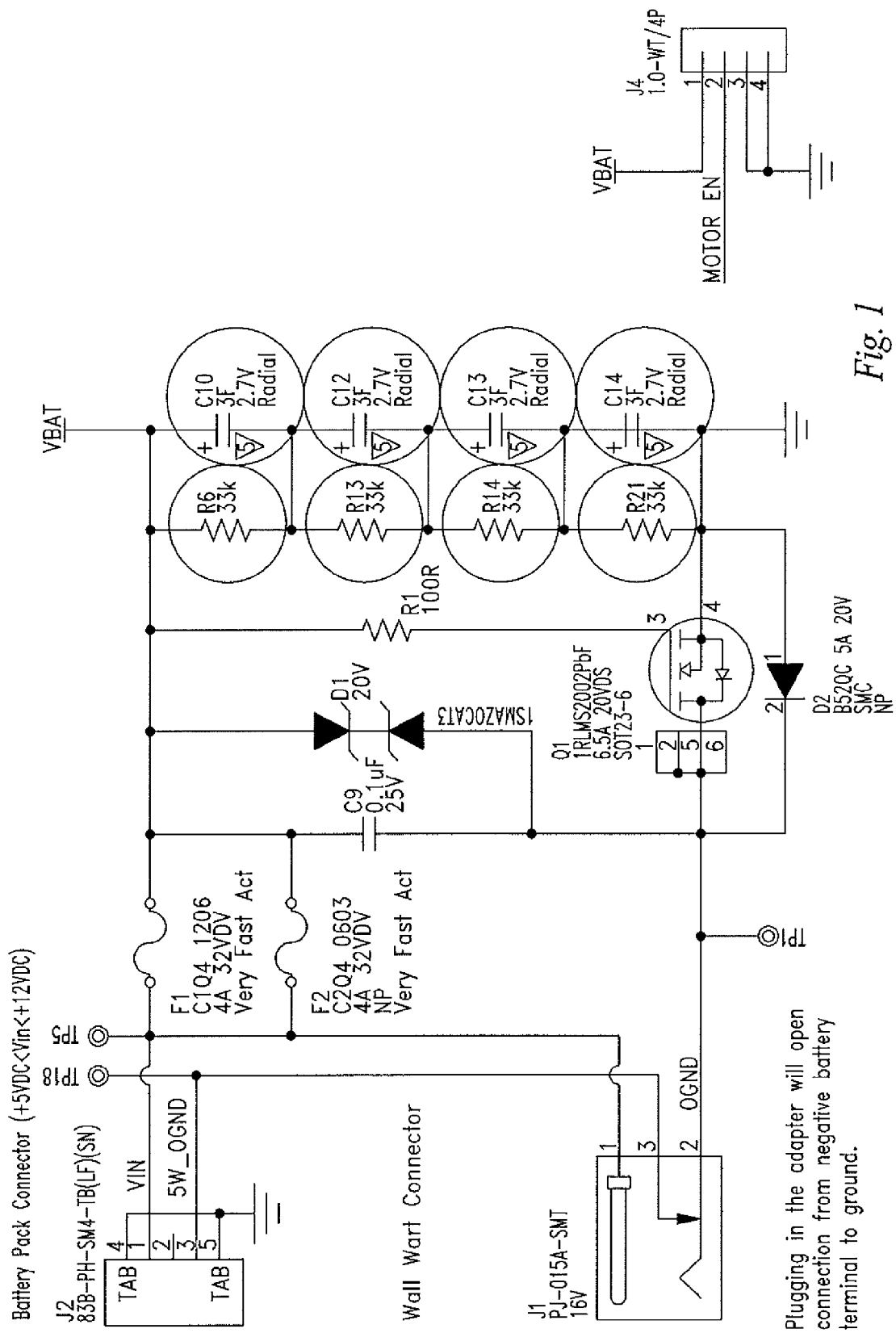
FIG. 1 is a power supply schematic of a power supply board for utilization with a motor powered paper towel dispenser and illustrating a series of supercapacitors incorporated in the circuit.

FIG. 1 illustrates a power supply schematic of a power supply board which incorporates the present invention. The power supply 10 may be utilized to power an electronic dispenser, for example an electronic paper towel dispenser including a motor which is utilized to rotate a roller and cause dispensing of paper toweling. Such dispensers are well known and operate to dispense predetermined lengths of toweling on an intermittent basis.

Figure 4:
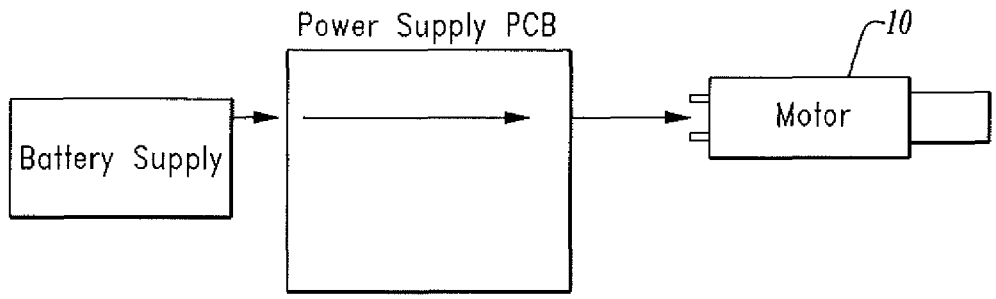
FIG. 4 is a diagram illustrating the prior art approach of employing a battery supply, a power supply printed circuit board without supercapacitors, and a motor utilized to power a dispenser motor and diagrammatically illustrating only the battery supply powering the motor.
Figure 5:
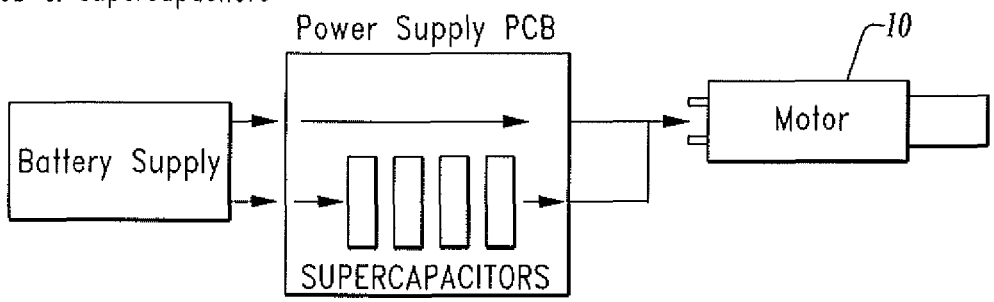
FIG. 5 is a diagram illustrating a battery supply, a power supply printed circuit board incorporating a series of supercapacitors, and a motor utilized to power a dispenser, illustrating the ability of either or both of the battery supply and supercapacitors to power the motor.
Figure 6:
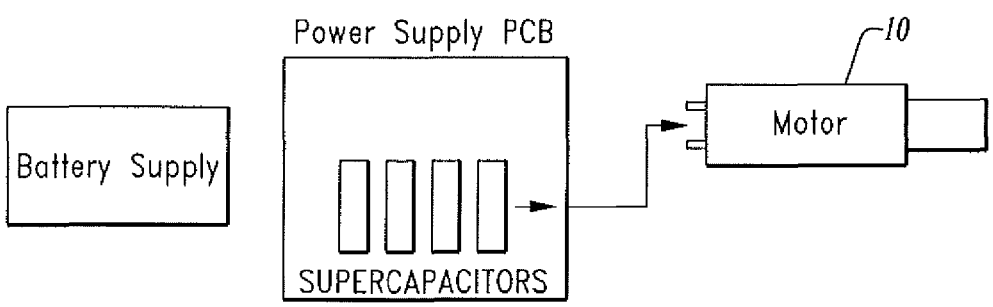
FIG. 6 is a diagram illustrating a battery supply, a printed circuit board incorporating a series of supercapacitors, and a motor utilized to power a dispenser, illustrating the battery supply disconnected from the printed circuit board and only the supercapacitors powering the motor.

FIGS. 4-6 show a motor 12 of a paper towel dispenser, the other structural features of such dispenser not illustrated; the dispenser being any known prior art motor driven toweling support roller type.

The components and circuitry of the supply schematic shown in FIG. 1 may be of any known type, except for the series of supercapacitors C10, C12, C13 and C14 incorporated in the power supply circuit and voltage balancing resistors R6, R13, R14 and R21. The balancing resistors ensure that all of the supercapacitors are being used equally throughout the life span of the components. The supercapacitors and voltage balancing resistors may be incorporated in power supply circuits of known types other than that shown in accordance with the teachings of the present invention.

This invention reduces the current drain and current spike impact on batteries, such as alkaline batteries, employed with the power supply circuit. In the arrangement illustrated, the batteries are in a battery pack (not shown) connected to the circuit. By implementing a series combination of supercapacitors C10, C12, C13 and C14 into the design, the overall battery life will be increased and the dispenser will be able to deliver more product. The number and types of supercapacitors employed will of course depend upon the particular power circuit with which they are associated.

When the batteries are initially connected to the supply board to furnish power thereto they will pre-charge the supercapicitors. Pre-charging can also be accomplished by wall power. On motor start, the initial stall current can typically demand more than ten times the steady state operating current in paper towel dispensers. This current demand places huge draw requirements on the batteries. Instead of pulling this energy from the batteries, the excess current demand is either (a) withdrawn from the supercapacitors or (b) withdrawn partially from both the alkaline batteries and the supercapacitors. Either method will reduce the overall impact on the batteries and prolong battery life.

As the supercapacitors can supply energy only for a relatively short period of time, the batteries will need to continually replenish the charge. The supercapacitors share the incoming power spike, reducing the impact on the batteries and increasing the overall life span of the batteries.

FIG. 4 is a diagrammatic illustration of a battery supply solely powering the motor directly, the typical prior art situation. When the motor demands power, it draws a significant current spike on the battery pack and as a result decreases overall battery life.

FIG. 5 diagrammatically illustrates a situation wherein supercapacitors are utilized in the power supply in accordance with the teachings of the present invention. Upon insertion of batteries into electrical connection with the power supply, the batteries charge the supercapacitors. When the motor demands power, it draws current from both the supercapacitors and the battery supply simultaneously. The supercapacitors share the voltage spike (reducing the current spike on the batteries) resulting in longer battery life.

In FIG. 6 the battery supply has been disconnected and only the supercapacitors can power the motor. When the motor demands power, it draws current from the supercapacitors only. This will only last until the stored charge is drained from the supercapacitors (typically 8-12 cycles in a conventional paper towel dispenser application).

Figure 2:
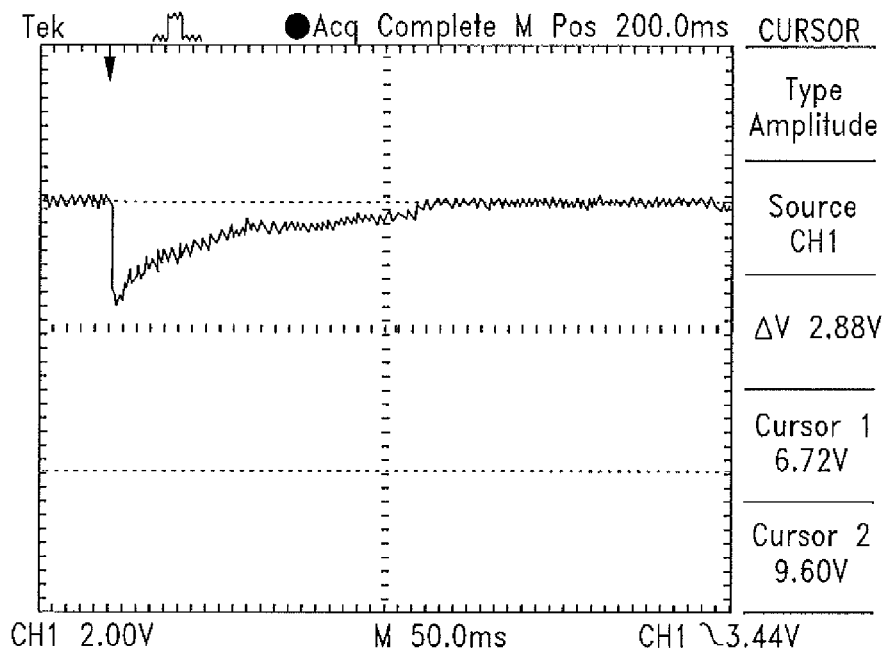
FIG. 2 is a diagram illustrating circuit drain without supercapacitors.
Figure 3:
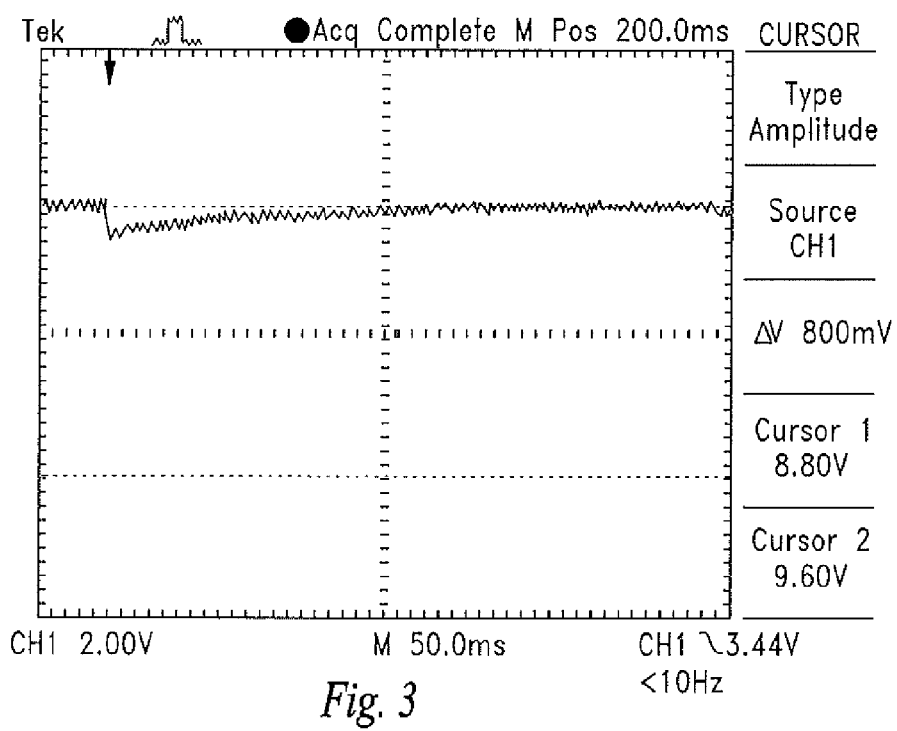
FIG. 3 is a diagram illustrating circuit drain with supercapacitors.

FIG. 2 is a diagram illustrating circuit drain without supercapacitors employed in a power supply circuit. FIG. 3 illustrates circuit drain when supercapacitors are incorporated in the power supply circuit.

In summary, the present invention relates to the approach of incorporating supercapacitors into the power supply circuit to handle the voltage demands of the associated product and inherently take the voltage spike when a power request is needed.

Rather than using batteries for the purpose, wall power can be employed to initially and continually recharge the power levels stored in the supercapacitors.

The supercapacitors and batteries may provide solely or share the current demands depending upon the application or design.

By absorbing the power demands spike, the supercapacitors extend the life span of the alkaline or other battery supply.

The balancing resistors R6, R13, R14 and R21 are employed to ensure that all of the supercapacitors are being used equally throughout the life span of the components.

Since the supercapacitors are quick charging, the alkaline batteries can continually replenish the voltage and be ready for continual power demands.

The battery supply may be current limited to promote the supercapacitors as the primary power source in order to increase the overall capacity.

The invention claimed is:

1. Apparatus for reducing current drain and current spike impact on paper towel dispensers or other dispensers including an electric motor powered by at least one battery, said apparatus including a power supply circuit in operative association with said at least one battery and having a power input for receiving electrical power from said at least one battery, a power outlet in operative association with said electric motor, and at least one supercapacitor prechargeable by said at least one battery or an alternative electrical power source and said at least one supercapacitor during initial energization of said electric motor by said power supply circuit providing at least a portion of the energy requirement of said electric motor.

2. The apparatus according to claim 1 wherein said power supply circuit includes a series of supercapacitors.

3. The apparatus according to claim 2 wherein said power supply circuit additionally includes a plurality of voltage balancing resistors operatively associated with said supercapacitors for substantially ensuring that all of said supercapacitors are being used equally during operation of said apparatus.

4. The apparatus according to claim 1 wherein said power supply circuit is in operative association with a plurality of batteries and wherein said power input receives electrical power from said plurality of batteries.

5. The apparatus according to claim 1 wherein said power supply circuit is operable to utilize said at least one battery to replenish the charge of said at least one supercapacitor after initial energization of said electric motor.

6. In combination:
    at least one battery;
    a dispenser electric motor; and
    apparatus including a power supply circuit in operative association with said at least one battery and having a power input for receiving electrical power from said at least one battery, a power outlet in operative association with said dispenser electric motor, and at least one supercapacitor during initial energization of said electric motor by said power supply circuit providing at least a portion of the energy requirement of said dispenser electric motor.

7. The combination according to claim 6 wherein said power supply circuit includes a series of supercapacitors.

8. The combination according to claim 7 wherein said power supply circuit additionally includes a plurality of voltage balancing resistors operatively associated with said supercapacitors for substantially ensuring that all of said supercapacitors are being used equally during operation of said apparatus.

9. The combination according to claim 6 including a plurality of batteries and wherein said power input receives electrical power from said plurality of batteries.

10. The combination according to claim 6 wherein said power supply circuit is operable to utilize said at least one battery to replenish the charge of said at least one supercapacitor after initial energization of said dispenser electric motor.

11. A method for reducing current drain and current spike impact on paper towel dispensers or other dispensers including an electric motor powered by at least one battery, said method including the steps of:
    placing a power supply circuit having a power input, a power output and at least one supercapacitor in operative association with said at least one battery;
    providing electrical power from said at least one battery to said power input;
    placing said power outlet in operative association with said electric motor; and
    employing said at least one supercapacitor during initial energization of said electric motor by said power supply circuit to provide at least a portion of the energy requirement of said electric motor.

12. The method according to claim 11 including the step of using said at least one battery or an alternative electrical power source to precharge said at least one supercapacitor.

13. The method according to claim 11 wherein said power supply circuit includes a series of supercapacitors.

14. The method according to claim 13 wherein said power supply circuit additionally includes a plurality of voltage balancing resistors and wherein the method includes the step of operatively associating the voltage balancing resistors with said supercapacitors for substantially ensuring that all of said supercapacitors are being used equally during operation of said apparatus.

15. The method according to claim 11 including the step of placing the power supply circuit in operative association with a plurality of batteries whereby said power input receives electrical power from said plurality of batteries.

16. The method according to claim 11 including the step of employing said power supply circuit to utilize said at least one battery to replenish the charge of said at least one supercapacitor after initial energization of said electric motor.

* * * * *